United States Patent
Yun (10) Patent No.: US 10,130,076 B2
(45) Date of Patent: Nov. 20, 2018

(54) DOG HARNESS

(71) Applicant: Yeu Hoon Yun, Los Angeles, CA (US)

(72) Inventor: Yeu Hoon Yun, Los Angeles, CA (US)

( * ) Notice: Subject to any disclaimer, the term of this patent is extended or adjusted under 35 U.S.C. 154(b) by 430 days.

(21) Appl. No.: 15/068,626

(22) Filed: Mar. 13, 2016

(65) Prior Publication Data
US 2017/0258049 A1   Sep. 14, 2017

(51) Int. Cl.
*A01K 27/00* (2006.01)

(52) U.S. Cl.
CPC .......... *A01K 27/002* (2013.01); *A01K 27/005* (2013.01)

(58) Field of Classification Search
CPC .. A01K 27/002; A01K 1/0263; A01K 1/0272; A01K 27/003; A01K 27/005; Y10S 119/907; Y10S 119/905
USPC ....... 119/792, 793, 863, 907, 856, 864, 770, 119/771, 905
See application file for complete search history.

(56) References Cited

U.S. PATENT DOCUMENTS

| | | | | |
|---|---|---|---|---|
| 5,150,667 A * | 9/1992 | Salidrigas | ............ | A01K 27/002 119/863 |
| 5,247,905 A * | 9/1993 | Arakawa | ............... | A01K 27/002 119/863 |
| 5,329,885 A * | 7/1994 | Sporn | ................... | A01K 27/002 119/792 |
| 5,611,298 A * | 3/1997 | Sporn | ................... | A01K 27/002 119/792 |
| 5,915,335 A * | 6/1999 | Holt, Jr. | ................ | A01K 1/0263 119/770 |
| 6,167,844 B1 * | 1/2001 | Cantrell | ............... | A01K 27/002 119/792 |
| 6,213,057 B1 * | 4/2001 | Franco | ................. | A01K 27/002 119/793 |
| 7,107,939 B2 * | 9/2006 | Lady | .................... | A01K 27/002 119/792 |
| 7,165,511 B1 * | 1/2007 | Brezinski | ............. | A01K 27/002 119/792 |
| 7,757,641 B1 * | 7/2010 | Worden | ............... | A01K 27/002 119/792 |
| 8,166,924 B2 * | 5/2012 | Cho | ...................... | A01K 27/002 119/792 |
| D664,310 S * | 7/2012 | Ito | ......................... | A01K 27/002 D30/144 |
| 8,381,688 B1 * | 2/2013 | Wejrowski | ........... | A01K 27/002 119/792 |
| 8,950,364 B1 * | 2/2015 | Wamsat | ............... | A01K 27/002 119/856 |
| 9,491,931 B2 * | 11/2016 | Yamin | ................... | A01K 27/002 |
| 9,668,458 B2 * | 6/2017 | Sporn | ................... | A01K 27/002 |
| 2004/0025804 A1 * | 2/2004 | Smith | .................. | A01K 1/0263 119/792 |

(Continued)

*Primary Examiner* — Yvonne R Abbott-Lewis
(74) *Attorney, Agent, or Firm* — Heedong Chae; Lucem, PC (57) ABSTRACT

A dog harness includes a harness body, having a front portion and a rear portion, first and second front straps, first and second rear straps, first and second coupling members, first and second leash straps and a connecting means, wherein the first leash strap loops through the first coupling member such that the first leash strap is adapted to move relative to the first coupling member, wherein the second leash strap loops through the second coupling member such that the second leash strap is adapted to move relative to the second coupling member.

20 Claims, 10 Drawing Sheets

(56) References Cited

U.S. PATENT DOCUMENTS

2008/0105216 A1* 5/2008 Sporn .................. A01K 27/002
                                                    119/863
2015/0164049 A1* 6/2015 Lai ..................... A01K 27/002
                                                    119/792
2017/0265438 A1* 9/2017 Sporn ................... A44B 11/04

* cited by examiner

DOG HARNESS

CROSS-REFERENCE TO RELATED APPLICATIONS

Not applicable.

FIELD OF THE INVENTION

The present invention relates to a harness for a dog, and more particularly, a dog harness having a tightening or adjusting means for preventing a dog from escaping the dog harness. The dog harness tightens when the dog tries to move forwards or backwards against the pulling force of the leash held by a dog owner, thereby preventing the dog slipping out of and escaping from the dog harness. Once the dog stops applying pressure against the pulling force of the leash held by the user, the dog harness releases back to make the dog feel comfortable.

BACKGROUND OF THE INVENTION

A dog harness is a piece of equipment for dogs, worn around a dog's torso and/or neck. The dog harness usually has a loop structure, which surrounds a dog's torso and/or neck, and a leash attachment means to be connected to a leash. The dog harness and leash are usually used together to restrain or control a dog, commonly used when walking a dog. Instead of the loop structure, a garment may be used to surround a dog's torso, including a dog's chest and/or belly.

Compared to a collar worn around a neck, a dog harness is better in preventing choking or lowering chance of slipping out of it because of its structure surrounding a dog's torso and neck and thereby distributing force. Thus, a dog harness is growing in popularity among many dog owners, especially for those having smaller breed dogs. The dog harness is also useful for controlling, directing and teaching the dog.

However, a dog harness is not free from the issue of slipping out. If a dog trying to move forward or backward against the direction of the leash held by a user, a dog harness may become loose and a dog may slip out of it and escape. Especially, when a dog tries hard to move backward against the pulling force of the leash held by a user and lower its head, there may be a room formed and getting bigger between the dog's back of neck and the leash connector connecting the leash and the dog harness, thereby allowing the dog to slip out and escape the dog harness.

Therefore, to solve the above problems, there is a need for a dog harness having a freely moving leash strap for tightening and fastening the dog's torso when the dog tries to move backwards to escape from the dog harness. This invention is directed to solve these problems and satisfy the long-felt need.

SUMMARY OF THE INVENTION

The present invention provides a dog harness having a freely moving leash strap for tightening and fastening the dog's torso when the dog tries to move backwards to escape from the dog harness. Once the dog stops to move against a leash, the dog harness begins to be released back.

The object of the present invention is to provide a dog harness, which includes a harness body comprises an inner surface and an outer surface wherein the inner surface is contact with a torso of a dog, wherein the harness body which includes a front portion, having first and second ends of the front portion, being adapted to be positioned on the dog's torso in front of front legs of the dog; and a rear portion, having first and second ends of the rear portion, being adapted to be positioned, on the dog's torso behind the front legs of the dog; a first front strap, having first and second ends of the first front strap; a second front strap, having first and second ends of the second front strap; a first rear strap, having first and second ends of the first rear strap; a second rear strap, having first and second ends of the second rear strap; a first coupling member, having first and second openings of the first coupling member, to couple the first end of the first front strap and the first end of the first rear strap; a second coupling member, having first and second openings of the second coupling member, to couple the first end of the second front strap and the first end of the second rear strap; a first leash strap, having first and second ends of the first leash strap, wherein the first end of the first leash strap is adapted to foe connected to a leash; a second leash strap, having first and second ends of the second leash strap, wherein the first end of the second, leash, strap is adapted to be connected to the leash; and a connecting means, having first and second members, wherein the first member of the connecting means is connected to the second end of the first leash strap and the second member of the connecting means is connected to the second end of the second leash strap; wherein the first leash strap loops through the first coupling member such that the first leash strap is adapted to move relative to the first coupling member; wherein the second leash strap loops through the second coupling member such that the second leash strap is adapted to move relative to the second coupling member.

Another object of the present invention is to provide a dog harness which includes a harness body, having an inner surface and an outer surface wherein the inner surface is contact with a torso of a dog, wherein the harness body which includes a left portion, having a end of the left portion and a left loop, being adapted to be positioned on the dog's torso and surrounding around a left front leg of the dog, wherein the left loop fixedly attached the end of the left portion, and a right portion, having a end of the right portion and a right loop, being adapted to be positioned on the dog's torso and surrounding around a right front leg of the dog, wherein the right loop fixedly attached the end of the right portion; a first coupling member, having first and second openings of the first coupling member, to couple the left loop of the left portion; a second coupling member, having first and second openings of the second coupling member, to couple the right loop of the left portion; a first leash strap, having first and second ends of the first leash strap, wherein the first end of the first leash strap is adapted to be connected to a leash; a second leash strap, having first and second ends of the second leash strap, wherein the first end of the second leash strap is adapted to be connected to the leash; and a connecting means, having first and second members, wherein the first member of the connecting means is connected to the second end of the first leash strap and the second member of the connecting means is connected to the second end of the second leash strap; wherein the first leash strap loops through the first coupling member such that the first leash strap is adapted to freely move relative to the first coupling member; wherein the second leash strap loops through the second coupling member such that the second leash strap is adapted to freely move relative to the second coupling member.

The advantages of the present invention are: (1) the present invention provides dog harness having a tightening and releasing structure for preventing a dog from escaping the dog harness especially when the dog tries hard to move backwards to escape from the dog harness; (2) the present invention has a simple structure, but is very effective in preventing slip out; (3) the present invention makes a dog feel comfortable while wearing it; (4) the present invention is easy to manufacture and use; (5) the structure of the present invention is pleasing in appearance and functionally superior; and (6) the dog harness of the present invention is convenient to adjust a dog harness to snugly fit different sizes of a dog.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

The present invention provides a dog harness having a freely moving leash strap for tightening and fastening a dog's torso when the dog tries to move backwards to escape from the dog harness against the pulling force of the leash held by a user. Once the dog stops moving backwards against the pulling force of the leash, the dog harness begins to be released back.

Figure 1:
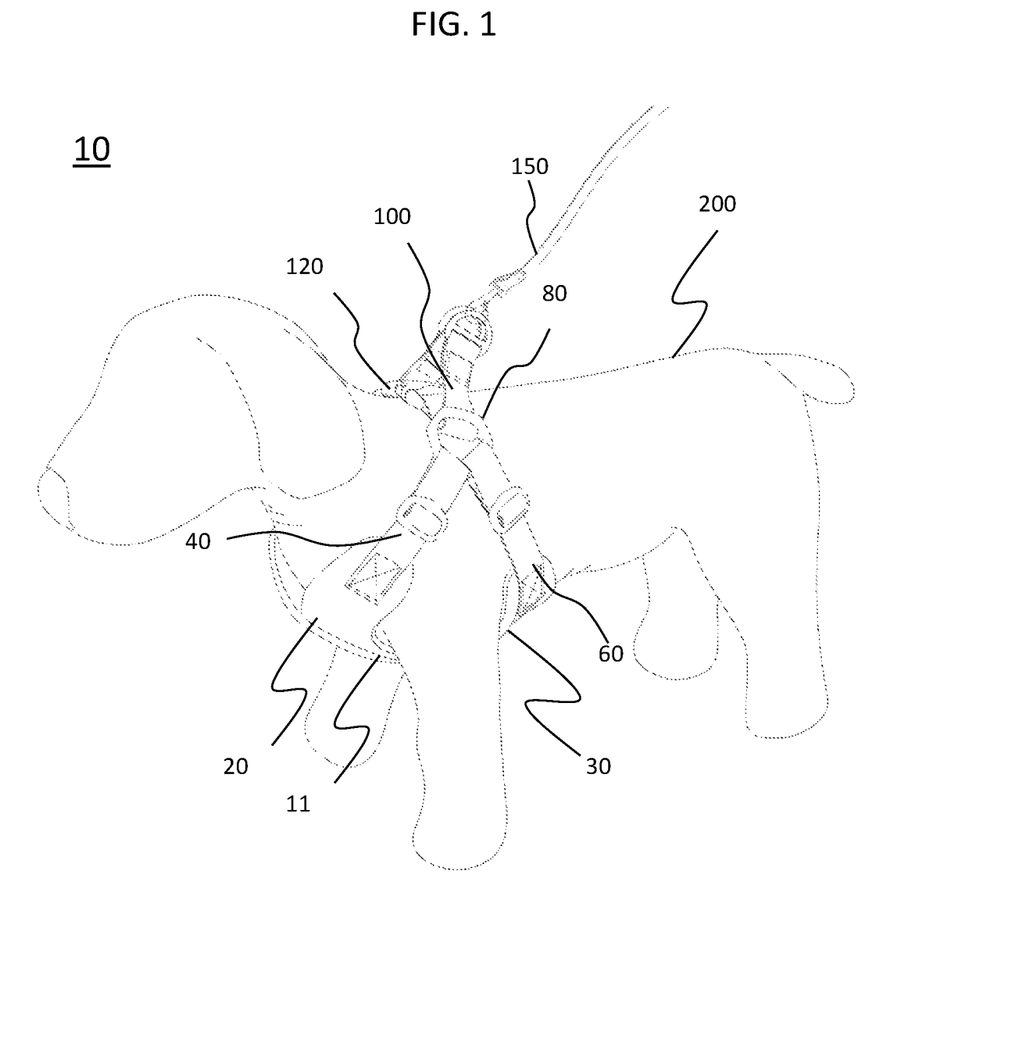
FIG. 1 shows a perspective view of a dog harness according to one embodiment of the present invention fitted to a dog.
Figure 2:
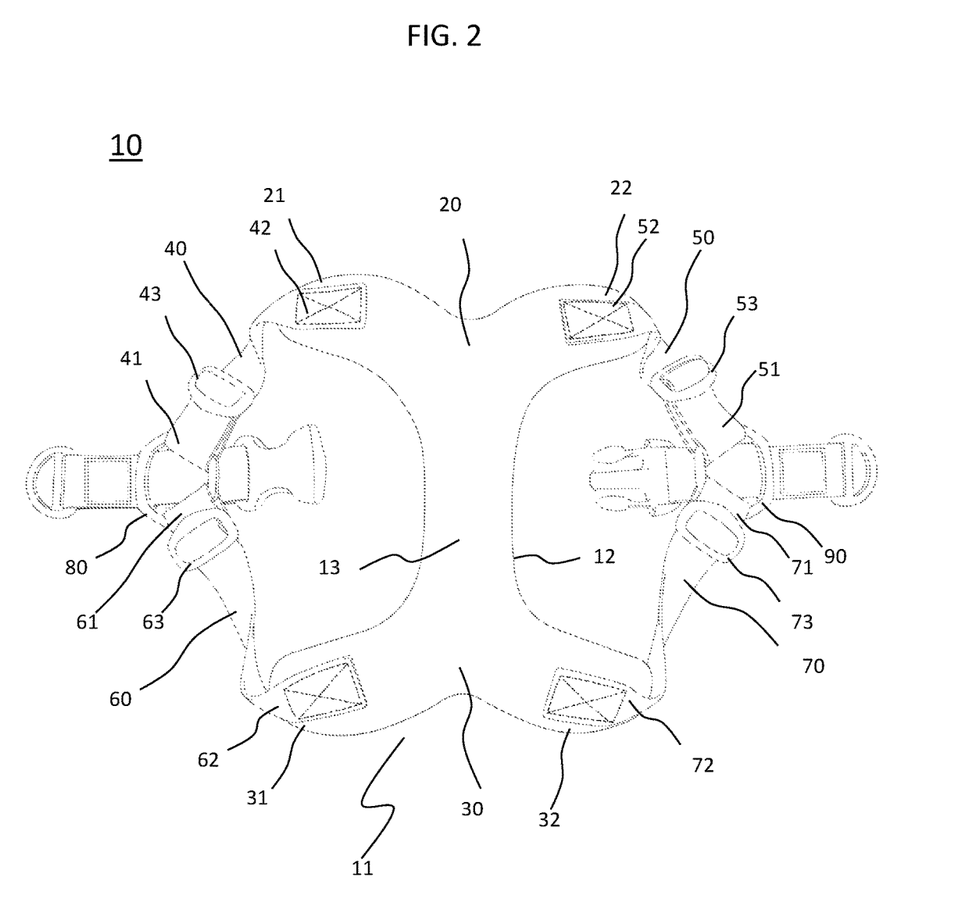
FIG. 2 shows an outer portion perspective view of a dog harness of FIG. 1.
Figure 3:
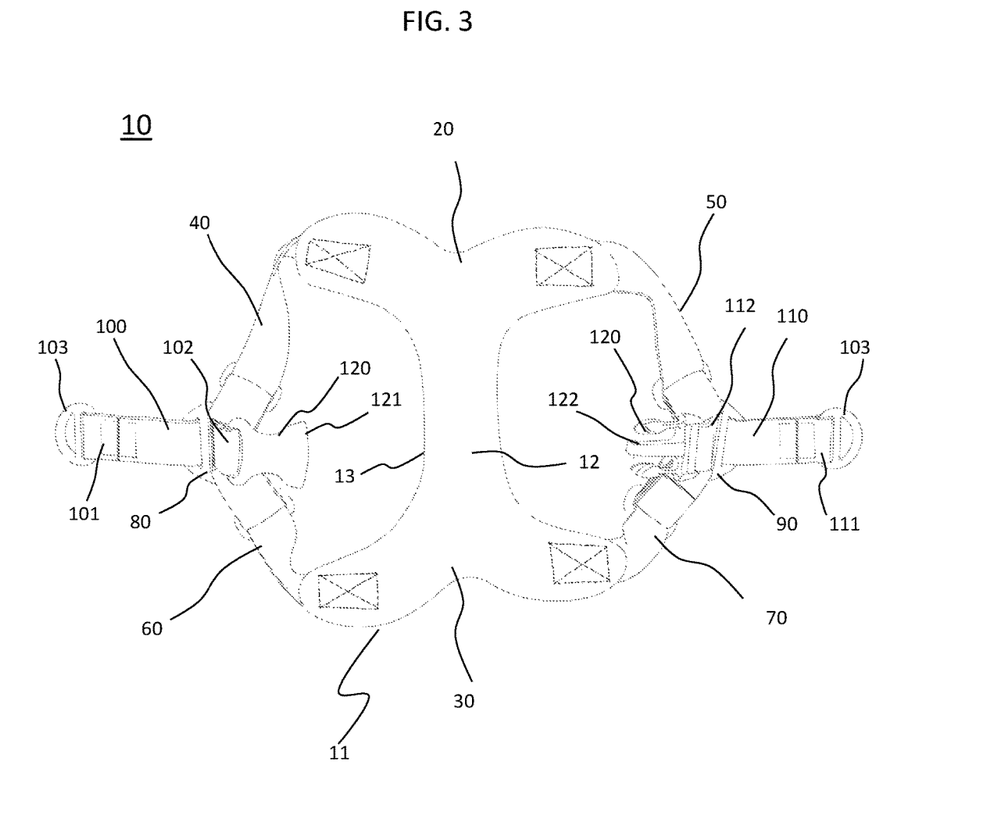
FIG. 3 shows an inner portion perspective view of the dog harness of FIG. 1.

FIG. 1 shows a perspective view of the dog harness according to one embodiment of the present invention fitted to the dog. FIG. 2 and FIG. 3 respectively show an outer-portion and an inner portion of the dog harness of FIG. 1.

The dog harness 10 of the present invention may comprise a harness body 11, having an inner surface 12 and an outer surface 13 wherein the inner surface 12 may be contact with a torso of a dog 200. The harness body 10 further may comprise a front portion 20, having first and second ends 21, 22 of the front portion 20, may be adapted to be positioned on the dog's torso in front of front legs of the dog 200 and a rear portion 30, having first and second ends 31, 32 of the rear portion 30, may be adapted to be positioned on the dog's torso behind the front legs of the dog 200. A first front strap 40 may include first and second ends 41, 42 of the first front strap 40. A second front strap 50 may include first and second ends 51, 52 of the second front strap 50. A first rear strap 60 may include first and second ends 61, 62 of the first rear strap and a second rear strap 70 may include first and second ends 71, 72 of the second rear strap. A first coupling member 80 may comprise first and second openings 81, 82 of the first coupling member 80, to couple the first end 41 of the first front strap 40 and the first end 61 of the first rear strap 60. A second coupling member 90, having first and second openings 91, 92 of the second coupling member 90, may be coupled the first end 51 of the second front strap 50 and the first end 71 of the second rear strap 70.

Figure 4:
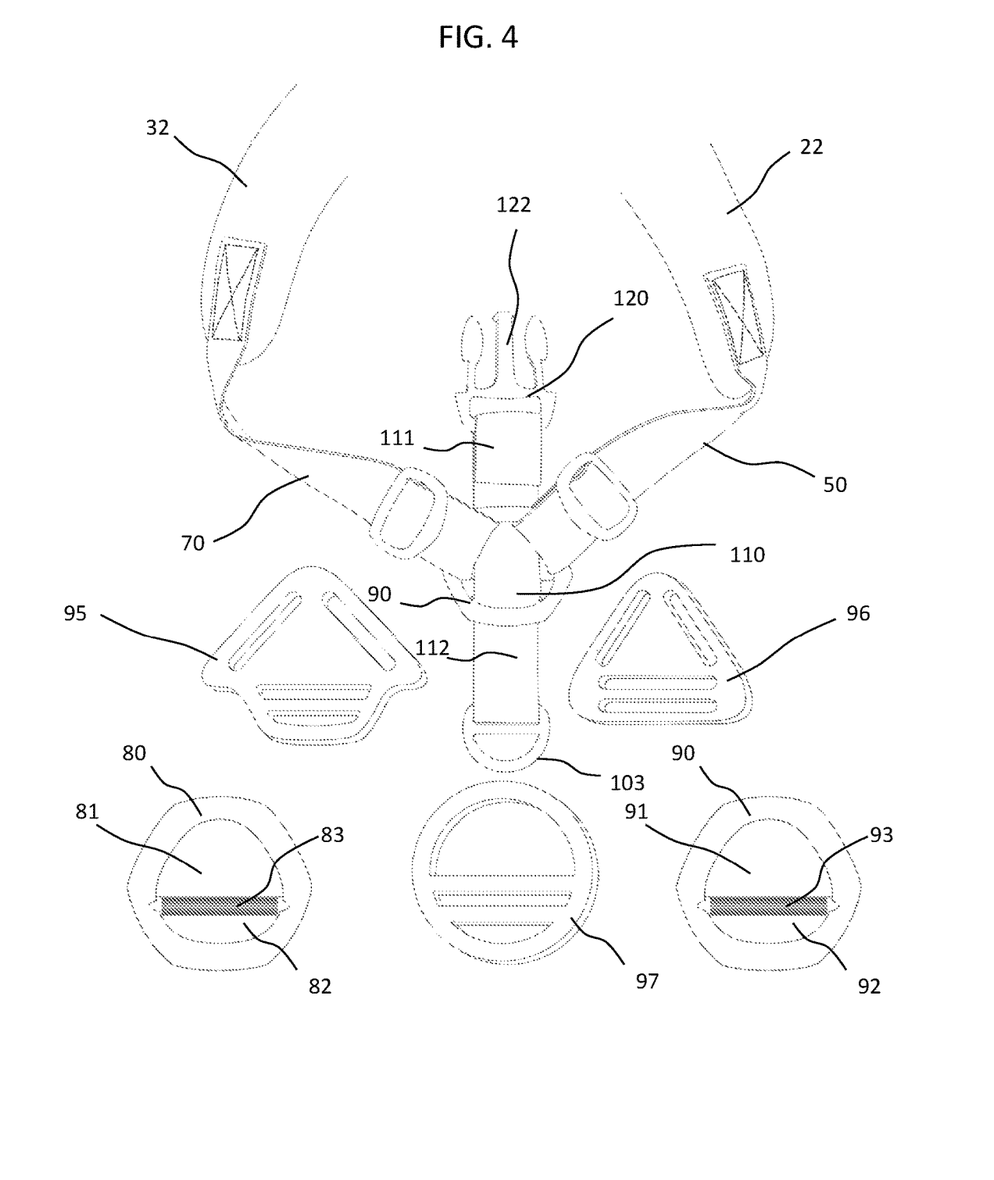
FIG. 4 shows a partial view of the dog harness of FIG. 1 with various coupling members.
Figure 5:
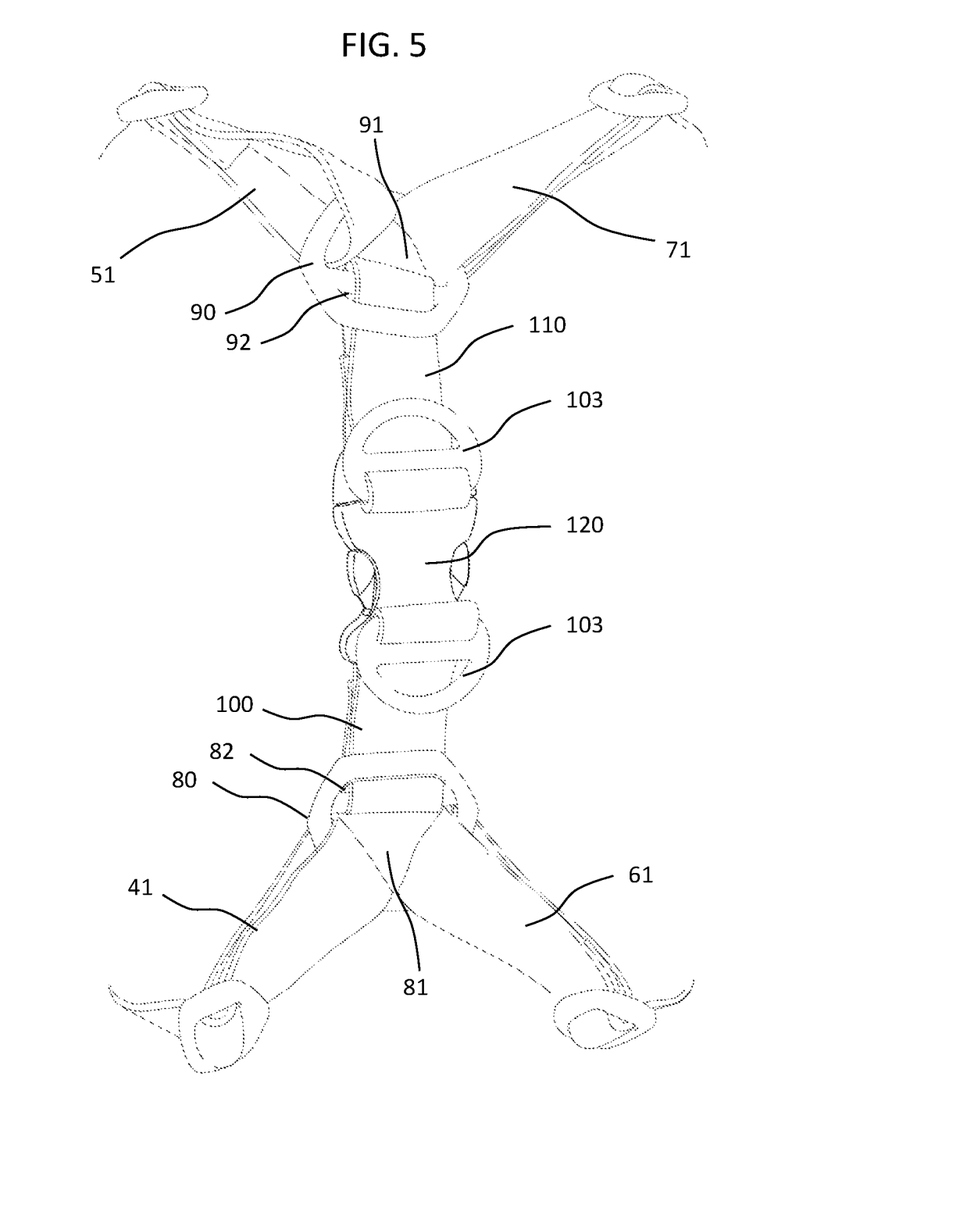
FIG. 5 shows another partial view of the dog harness of FIG. 1 when a connection means is connected with each other.
Figure 6:
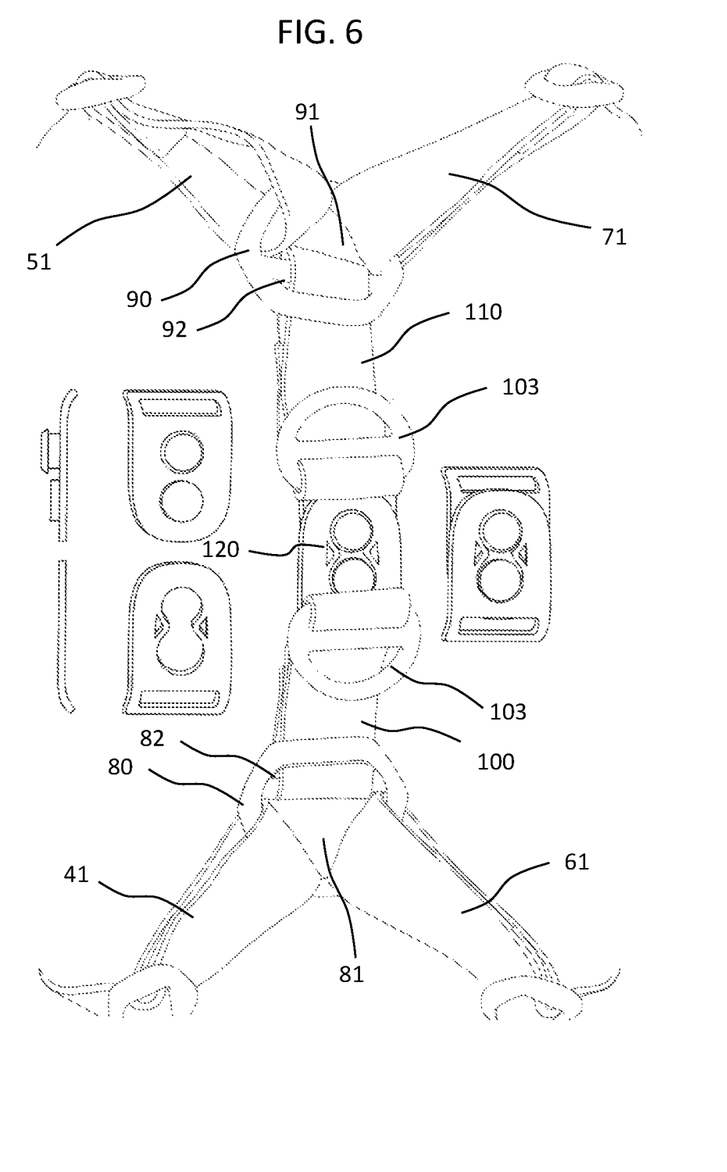
FIG. 6 shows another partial view of the dog harness of FIG. 1 with various connecting means.

FIG. 4 shows a partial view of the dog harness of FIG. 1 with various coupling members. FIG. 5 shows another partial view of the dog harness of FIG. 1 when a connection means is connected with each other and FIG. 6 shows another partial view of the dog harness of FIG. 1 with various connecting means.

A first leash strap 100 may comprise first and second ends 101, 102 of the first leash strap 100, wherein the first end 101 of the first leash strap 100 may be adapted to be connected to a leash 150. A second leash strap 110 may include first and second ends 111, 112 of the second leash strap 110, wherein the first end 112 of the second leash strap 110 may be adapted to be connected to the leash 150. A connecting means 120 may comprise first and second members 121, 122, wherein the first member 121 of the connecting means 120 may be connected to the second end 102 of the first leash strap 100 and the second member 122 of the connecting means 120 may be connected to the second end 112 of the second leash strap 110. The first leash strap 100 may loop through the first coupling member 80 such that the first leash strap 100 may be adapted to freely move relative to the first coupling member 80 and the second leash strap 110 may loop through the second coupling member 90 such that the second leash strap 110 may be adapted to freely move relative to the second coupling member 90.

Figure 7A:
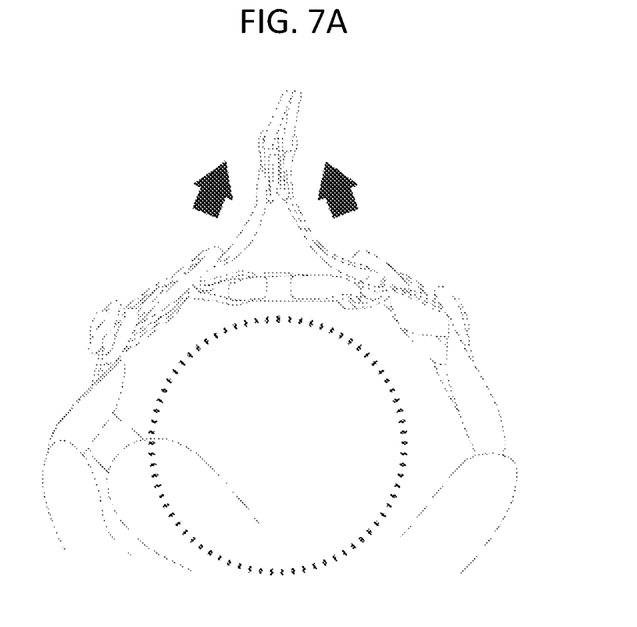
FIG. 7A shows a front perspective view of the dog harness of FIG. 1 when a leash strap is tightened.
Figure 7B:
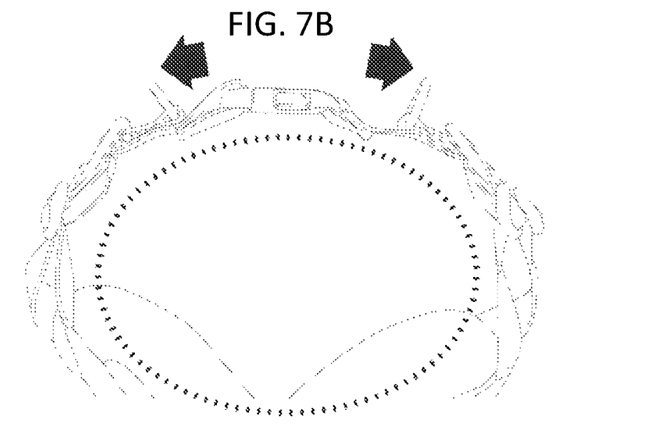
FIG. 7B shows a front perspective view of the dog harness of FIG. 1 when the leash strap loosens.

FIG. 7A shows a front perspective view of the dog harness of FIG. 1 when a leash strap is tightened and FIG. 7B shows a front perspective view of the dog harness of FIG. 1 when the leash strap loosens.

The first leash strap 100 may be adapted to freely move between a first predetermined position and a second predetermined position relative to the first coupling member 80. The second leash strap 110 may be adapted to freely move between a third predetermined position and a fourth predetermined position relative to the second coupling member 90.

Because of the structure of freely moving leash straps, the dog harness 10 of the present invention can prevent a dog from slip out or escaping the dog harness 10. Especially, when a dog tries hard to move backward against the pulling force of the leash 150 held by a user and lower its head, there may be a room formed and getting bigger between the dog's back of neck and the leash connector connecting the leash and the dog harness, thereby allowing the dog to slip out and escape the dog harness.

However, in the present invention, the dog harness is tightened or fastened when the dog tries to move backward against the pulling force of the leash. Once the dog stops moving backwards against the pulling force of the leash, the dog harness begins to be released back.

Preferably, the first leash strap 100 way pass through the first opening 81 of the first coupling member 80 and may pass back again through in the opposite direction the second opening 82 of the first coupling member 80. But, a D-ring 103 and the connecting means 120 of first and second ends 101, 102 of the first leash strap 100 cannot pass through the second opening 82 of the first opening 80. The second leash strap 110 may pass through the first opening 91 of the first coupling member 90 and may pass back again through in the opposite direction the second opening 32 of the second coupling member 90. But, a D-ring 103 and the connecting means 120 of first and second ends 111, 112 of the first leash strap 110 cannot pass through the second opening 92 of the first opening 90.

The first coupling member 80 may be a hexagon-shaped ring having openings, a triangle-shaped plate having openings or a circle-shaped ring having openings. The second coupling member 90 may be a hexagon-shaped ring having openings, a triangle-shaped plate having openings or a circle-shaped ring having openings.

The first end 101 of the first leash straps 100 and the first end 111 of the second leash straps 110 may be received respectively a D-ring 103 connected the leash 150.

The connecting means 220 may be a two-piece buckle type fasteners or a breakaway buckle. The first member 121 of the connecting means 120 may be a female buckle and the second member 122 of the connecting means 120 may be a male buckle.

The harness body 10 may be formed in substantially an I-shaped or X-shaped and the harness body 10 may be made of mesh polyester. The first and second front straps 40, 50 further may comprise respectively adjustable slides 43, 53 to adjust length of the first and second front straps 40, 50. The first and second rear straps 60, 70 further may comprise respectively adjustable slides 63, 73 to adjust length of the first and second rear straps 60, 70.

Figure 8:
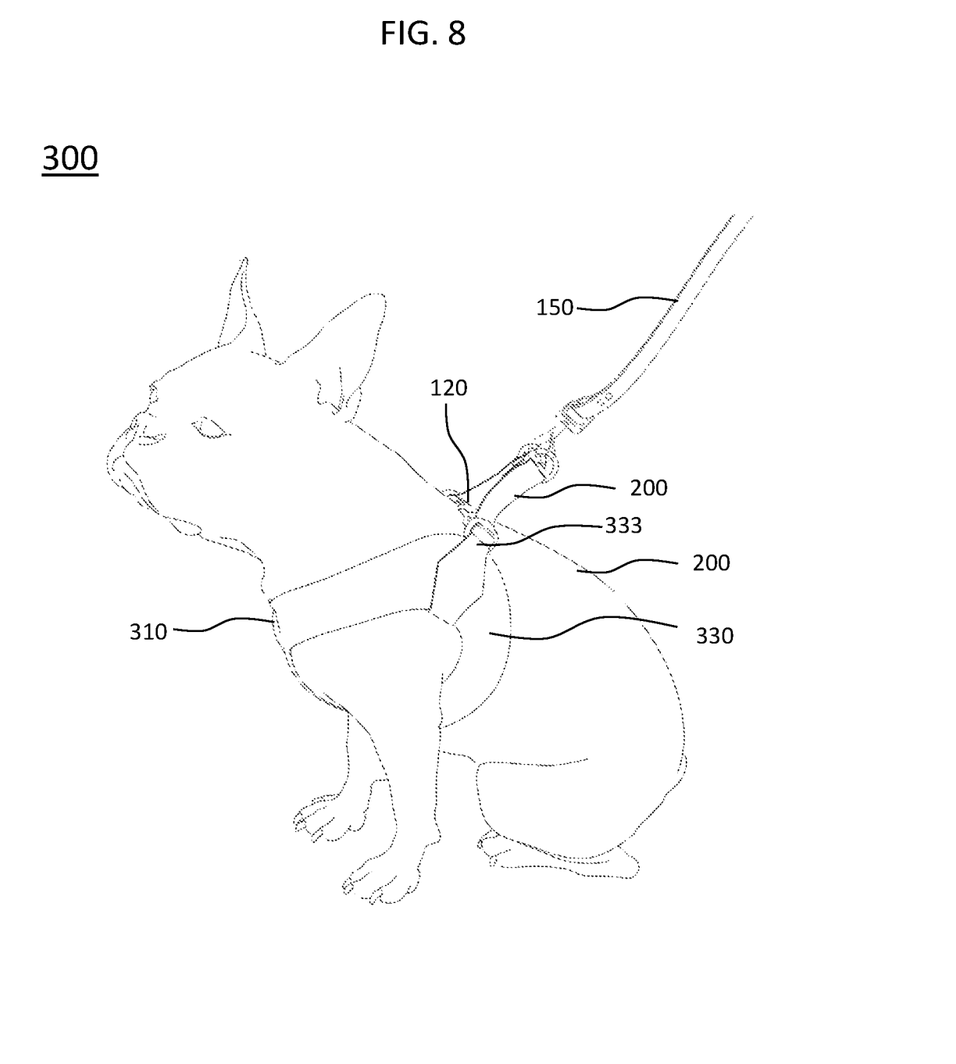
FIG. 8 shows a perspective view of the dog harness of according to another embodiment of the present invention fitted to a dog.
Figure 9:
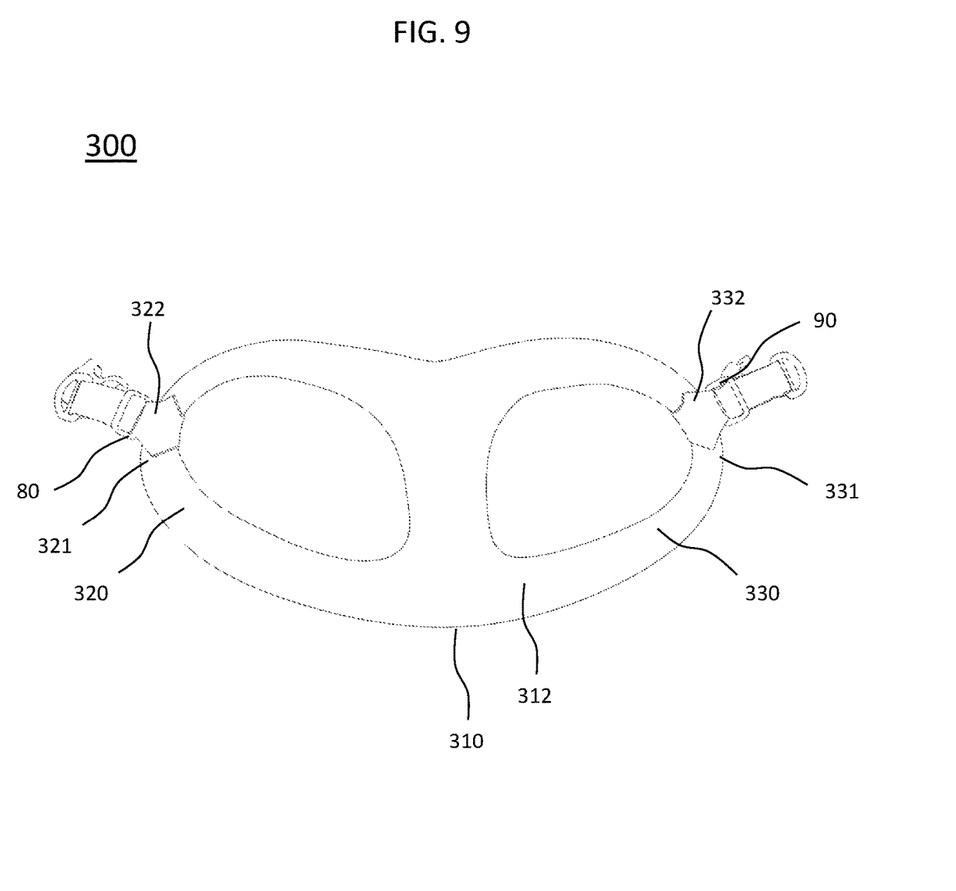
FIG. 9 shows an outer portion perspective view of a dog harness of FIG. 8.
Figure 10:
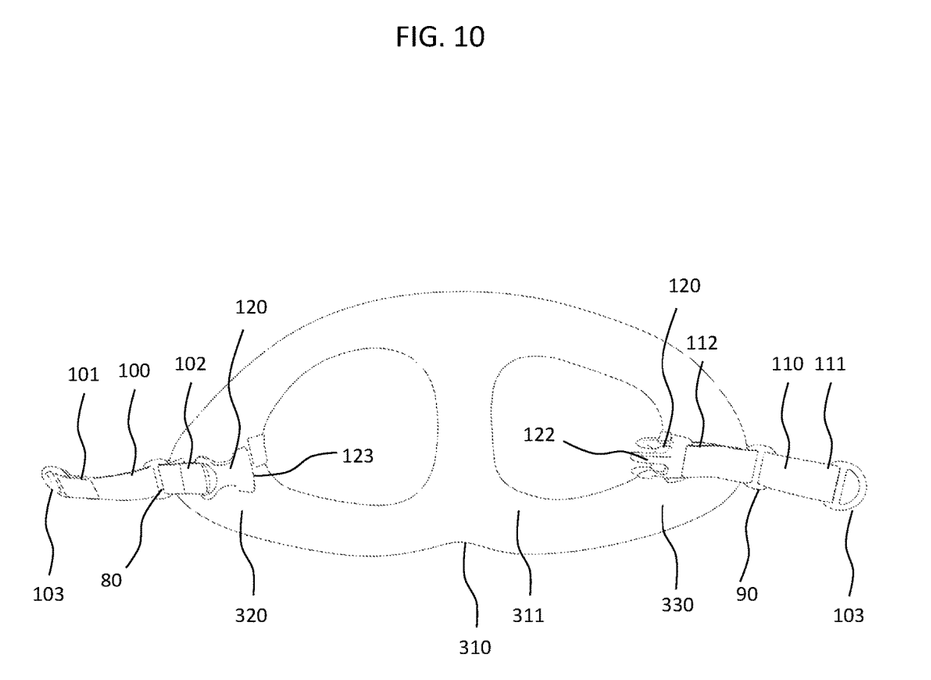
FIG. 10 shows an inner portion perspective view of the dog harness of FIG. 8.

FIG. 8 shows a perspective view of the dog harness of according to another embodiment of the present invention fitted to a dog. FIG. 9 shows an outer portion perspective view of a dog harness of FIG. 8 and FIG. 10 shows an inner portion perspective view of the dog harness of FIG. 8.

The dog harness 300 may comprise a harness body 310, having an inner surface 311 and an outer surface 312 wherein the inner surface 311 is contact with a torso of a dog 200. The harness body 310 further may comprise a left portion 320, having a end 321 of the left portion 320 and a left loop 322, may be adapted to be positioned on the dog's torso and surrounding around a left front leg of the dog 200. The left loop 322 may be fixedly attached the end 321 of the left portion 320. A right portion 330, having a end 331 of the right portion 330 and a right loop 332, may be adapted to be positioned on the dog's torso and surrounding around a right front leg of the dog 200. The right loop 332 may be fixedly attached the end 331 of the right portion.

A first coupling member 80, having first and second openings 81, 82 of the first coupling member 80, may be couple the left loop 322 of the left portion 320. A second coupling member 90, having first and second openings 91, 92 of the second coupling member 90, may be coupled the right loop 332 of the right portion 330.

A first leash strap 100 may include first and second ends 101, 102 of the first leash strap 100, wherein the first end 101 of the first leash strap 100 may be adapted to be connected to a leash 150. A second leash strap 110 may include first and second ends 111, 112 of the second leash strap 110, wherein the first end 112 of the second leash strap 110 may be adapted to be connected to the leash 150.

A connecting means 120 may comprise first and second members 121, 122 wherein the first member 121 of the connecting means 120 may be connected to the second end 102 of the first leash strap 100 and the second member 122 of the connecting means 120 may be connected to the second end 112 of the second leash strap 110 wherein the first leash strap 100 may loop through the first coupling member 80 such that the first leash strap 100 may be adapted to freely move relative to the first coupling member 80. The second leash strap 110 may loop through the second coupling member 90 such that the second leash strap 110 may be adapted to freely move relative to the second coupling member 90.

The first leash strap 100 may be adapted to freely move between a first predetermined position and a second predetermined position relative to the first coupling member 80. The second leash strap 110 may be adapted to freely move between a third predetermined position and a fourth predetermined position relative to the second coupling member 90.

The first leash strap 100 pass through the first opening 81 of the first coupling member 80 and passes back again through in the opposite direction the second opening 82 of the first coupling member 80. But, a D-ring 103 and the connecting means 120 of first and second ends 101, 102 of the first leash strap 100 cannot pass through the second opening 82 of the first opening 80. The second leash strap 110 may pass through the first opening 91 of the first coupling member 90 and may pass back again through in the opposite direction the second opening 92 of the second coupling member 90. But, a D-ring 103 and the connecting means 120 of first and second ends 111, 112 of the first leash strap 110 cannot pass through the second opening 92 of the first opening 90.

The first coupling member 80 may be a hexagon-shaped ring having openings or a triangle-shaped plate having openings or a circle-shaped ring having openings. The second coupling member 90 may be a hexagon-shaped ring having openings or a triangle-shaped plate having openings or a circle-shaped ring having openings.

The first, end 101 of the first leash straps 100 and the first end 111 of the second leash straps 110 may be respectively D-rings connected the leash 150. The connecting means 120 may be a two-piece buckle type fasteners or a breakaway buckle. The first member 121 of the connecting means 120 may be a female buckle and the second member 122 of the connecting means 120 is a male buckle. The harness body 310 may be formed in substantially an 8-shaped and may be made of mesh polyester.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A dog harness (10), comprising:
   a harness body (11), having an inner surface (12) and an outer surface (13) wherein the inner surface (12) is contact with a torso of a dog (200), wherein the harness body (10) comprising:
      a front portion (20), having first and second ends (21, 22) of the front portion (20), being adapted to be positioned on the dog's torso in front of front legs of the dog (200); and
      a rear portion (30), having first and second ends (31, 32) of the rear portion (30), being adapted to be positioned on the dog's torso behind the front legs of the dog (200);
   a first front strap (40), having first and second ends (41, 42) of the first front strap (40);
   a second front strap (50), having first and second ends (51, 52) of the second front strap (50);
   a first rear strap (60), having first and second ends (61, 62) of the first rear strap;
   a second rear strap (70), having first and second ends (71, 12) of the second rear strap;
   a first coupling member (80), having first and second openings (81, 82) of the first coupling member (80), to couple the first end (41) of the first front strap (40) and the first end (61) of the first rear strap (60);
   a second coupling member (90), having first and second openings (91, 92) of the second coupling member (90), to couple the first end (51) of the second front strap (50) and the first end (71) of the second rear strap (70);
   a first leash strap (100), having first and second ends (101, 102) of the first leash strap (100), wherein the first end (101) of the first leash strap (100) is adapted to be connected to a leash (150);
   a second leash strap (110), having first and second ends (111, 112) of the second leash strap (110), wherein the first end (112) of the second leash strap (110) is adapted to be connected to the leash (150); and
   a connecting means (120), having first and second members (121, 122), wherein the first member (121) of the connecting means (120) is connected to the second end (102) of the first leash strap (100) and the second member (122) of the connecting means (120) is connected to the second end (112) of the second leash strap (110),
   wherein the first leash strap (100) loops through the first coupling member (80) such that the first leash strap (100) is adapted to move relative to the first coupling member (80), wherein the second leash strap (110) loops through the second coupling member (90) such that the second leash strap (110) is adapted to move relative to the second coupling member (90).

2. The dog harness of claim 1, wherein the first leash strap (100) is adapted to move between a first predetermined position and a second predetermined position relative to the first coupling member (80).

3. The dog harness of claim 2, wherein the first leash strap (100) passes through the first opening (81) of the first coupling member (80) and passes back again through in the opposite direction the second opening (82) of the first coupling member (80).

4. The dog harness of claim 2, wherein the first coupling member (80) is a hexagon-shaped ring having openings, a triangle-shaped plate having openings or a circle-shaped ring having openings.

5. The dog harness of claim 1, wherein the second leash strap (110) is adapted to move between a third predetermined position and a fourth predetermined position relative to the second coupling member (90).

6. The dog harness of claim 5, wherein the second leash strap (110) passes through the first opening (91) of the first coupling member (90) and passes back again through in the opposite direction the second opening (92) of the second coupling member (90).

7. The dog harness of claim 5, wherein the second coupling member (90) is a hexagon-shaped ring having openings, a triangle-shaped plate having openings or a circle-shaped ring having openings.

8. The dog harness of claim 1, wherein the first end (101) of the first leash straps (100) and the first end (111) of the second leash straps (110) are received respectively a D-ring (103) connected the leash (150).

9. The dog harness of claim 1, wherein the connecting means (120) are a two-piece buckle type fasteners or a breakaway buckle.

10. The dog harness of claim 9, wherein the first member (121) of the connecting means (120) is a female buckle and the second member (122) of the connecting means (120) is a male buckle.

11. The dog harness of claim 1, wherein the harness body (10) is formed in substantially an I-shaped or X-shaped and the harness body is made of mesh polyester.

12. The dog harness of claim 1, wherein the first and second front straps (40, 50) further comprise respectively adjustable slides (43, 53) to adjust length of the first and second front straps (40, 50).

13. The dog harness of claim 1, wherein the first and second rear straps (60, 70) further comprise respectively adjustable slides (63, 73) to adjust length of the first and second rear straps (60, 70).

14. A dog harness (300), comprising:
   a harness body (310), having an inner surface (311) and an outer surface (312) wherein the inner surface (311) is contact with a torso of a dog (200), wherein the harness body (310) comprising:
      a left portion (320), having a end (321) of the left portion (320) and a left loop (322), being adapted to be positioned on the dog's torso and surrounding around a left front leg of the dog (200), wherein the left loop (322) fixedly attached the end (321) of the left portion (320); and
      a right portion (330), having a end (331) of the right portion (330) and a right loop (332), being adapted to be positioned on the dog's torso and surrounding around a right front leg of the dog (200), wherein the right loop (332) fixedly attached the end (331) of the right portion;
   a first coupling member (80), having first and second openings (81, 82) of the first coupling member (30), to couple the left loop (322) of the left portion (320);
   a second, coupling member (90), having first and second openings (91, 92) of the second coupling member (90), to couple the right loop (332) of the right portion (330);
   a first leash strap (100), having first and second ends (101, 102) of the first leash strap (100), wherein the first end (101) of the first leash strap (100) is adapted to be connected to a leash (150);
a second leash strap (110), having first and second ends (111, 112) of the second leash strap (110), wherein the first end (112) of the second leash strap (110) is adapted to be connected to the leash (150); and
a connecting means (120), having first and second members (121, 122), wherein the first member (121) of the connecting means (120) is connected to the second end (102) of the first leash strap (100) and the second member (122) of the connecting means (120) is connected to the second end (112) of the second leash strap (110),
wherein the first leash strap (100) loops through the first coupling member (80) such that the first leash strap (100) is adapted to (freely) move relative to the first coupling member (80),
wherein the second leash strap (110) loops through the second coupling member (90) such that the second leash strap (110) is adapted to move relative to the second coupling member (90),
wherein the first end (101) of the first leash straps (100) and the first end (111) of the second leash straps (110) are respectively D-rings connected the leash (150).

15. The dog harness of claim 14, wherein the first leash strap (100) is adapted to move between a first predetermined position and a second predetermined position relative to the first coupling member (80), wherein the first leash strap (100) passes through the first opening (81) of the first coupling member (80) and passes back again through in the opposite direction the second opening (82) of the first coupling member (80).

16. The dog harness of claim 15, wherein the first coupling member (80) is a hexagon-shaped ring having openings or a triangle-shaped plate having openings or a circle-shaped ring having openings.

17. The dog harness of claim 14, wherein the second leash strap (110) is adapted to move between a third predetermined position and a fourth predetermined position relative to the second coupling member (90), wherein the second leash strap (110) passes through the first opening (91) of the first coupling member (90) and passes back again through in the opposite direction the second opening (92) of the second coupling member (90).

18. The dog harness of claim 17, wherein the second coupling member (90) is a hexagon-shaped ring having openings or a triangle-shaped plate having openings or a circle-shaped ring having openings.

19. The dog harness of claim 14, wherein the connecting means (120) are a two-piece buckle type fasteners or a breakaway buckle, the first member (121) of the connecting means (120) is a female buckle and the second member (122) of the connecting means (120) is a male buckle.

20. The dog harness of claim 14, wherein the harness body (310) is formed in substantially an 8-shaped and is made of mesh polyester.

* * * * *